(12) United States Patent
Ojiro et al.

(10) Patent No.: US 12,429,002 B2
(45) Date of Patent: Sep. 30, 2025

(54) LOAD ADJUSTMENT METHOD, LOAD ADJUSTMENT DEVICE, AND PROGRAM

(71) Applicant: MITSUBISHI HEAVY INDUSTRIES, LTD., Tokyo (JP)

(72) Inventors: Yasuhiro Ojiro, Kanagawa (JP); Hirofumi Ohara, Kanagawa (JP); Masanori Fujioka, Kanagawa (JP); Yukihiko Inoue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 100 days.

(21) Appl. No.: 18/038,824

(22) PCT Filed: Dec. 1, 2021

(86) PCT No.: PCT/JP2021/044053
§ 371 (c)(1),
(2) Date: May 25, 2023

(87) PCT Pub. No.: WO2022/118872
PCT Pub. Date: Jun. 9, 2022

(65) Prior Publication Data
US 2024/0018912 A1    Jan. 18, 2024

(30) Foreign Application Priority Data
Dec. 4, 2020    (JP) .................. 2020-201642

(51) Int. Cl.
*F02C 9/28*    (2006.01)
*F01D 11/20*    (2006.01)
(Continued)

(52) U.S. Cl.
CPC ................ *F02C 9/28* (2013.01); *F01D 11/20* (2013.01); *F01D 11/22* (2013.01); *F01D 11/24* (2013.01);
(Continued)

(58) Field of Classification Search
CPC ...... F02C 7/26; F02C 7/28; F02C 9/00; F02C 9/28; F01D 11/20–24; F01D 19/02; F01D 21/003; F01D 25/10; F05D 2270/331
See application file for complete search history.

(56) References Cited

U.S. PATENT DOCUMENTS

2006/0233637 A1* 10/2006 Yakushi .................. F01D 17/00
415/13
2012/0131917 A1    5/2012 Piccirillo et al.
(Continued)

FOREIGN PATENT DOCUMENTS

DE    112014004335 T5    6/2016
DE    112018005376 T5    6/2020
(Continued)

OTHER PUBLICATIONS

International Search Report issued Jan. 18, 2022 in corresponding International Application No. PCT/JP2021/044053, with English language translation.
(Continued)

*Primary Examiner* — Jason H Duger
(74) *Attorney, Agent, or Firm* — Wenderoth, Lind & Ponack, L.L.P.

(57) ABSTRACT

A load adjustment method, comprising:
a step of acquiring a warm-up parameter indicating the degree of warm-up of a gas turbine during operation under load;
a step of determining an upper limit of a load increase rate in accordance with the warm-up parameter; and
a step of increasing the load of the gas turbine at or below the upper limit of the load increase rate.

14 Claims, 7 Drawing Sheets

(51) Int. Cl.

| | | |
|---|---|---|
| *F01D 11/22* | (2006.01) | |
| *F01D 11/24* | (2006.01) | |
| *F01D 19/02* | (2006.01) | |
| *F01D 21/00* | (2006.01) | |
| *F01D 25/10* | (2006.01) | |
| *F02C 7/26* | (2006.01) | |
| *F02C 7/28* | (2006.01) | |
| *F02C 9/00* | (2006.01) | |

(52) U.S. Cl.
CPC ........... *F01D 19/02* (2013.01); *F01D 21/003* (2013.01); *F01D 25/10* (2013.01); *F02C 7/26* (2013.01); *F02C 7/28* (2013.01); *F02C 9/00* (2013.01); *F05D 2270/331* (2013.01)

(56) References Cited

U.S. PATENT DOCUMENTS

| | | | |
|---|---|---|---|
| 2013/0104564 A1* | 5/2013 | Arar | F02C 9/18 60/785 |
| 2014/0123664 A1* | 5/2014 | Dion Ouellet | F02C 7/26 60/773 |
| 2015/0016949 A1* | 1/2015 | Smith | F01D 21/003 415/118 |
| 2015/0098791 A1 | 4/2015 | Ballard, Jr. et al. | |
| 2015/0184549 A1 | 7/2015 | Pamujula et al. | |
| 2015/0185716 A1 | 7/2015 | Wichmann et al. | |
| 2016/0146118 A1* | 5/2016 | Wichmann | F01D 21/003 701/100 |
| 2016/0230663 A1 | 8/2016 | Mizukami et al. | |
| 2016/0258363 A1 | 9/2016 | Tiwari et al. | |
| 2016/0281607 A1* | 9/2016 | Asati | F02C 7/26 |
| 2017/0138272 A1* | 5/2017 | Kusumi | H02K 7/14 |
| 2017/0218788 A1 | 8/2017 | Zhang et al. | |
| 2017/0284307 A1 | 10/2017 | Inoue et al. | |
| 2018/0135468 A1 | 5/2018 | Kayahara et al. | |
| 2020/0173373 A1 | 6/2020 | Ferns et al. | |

FOREIGN PATENT DOCUMENTS

| | | |
|---|---|---|
| JP | 54-130138 | 3/1953 |
| JP | 1-182531 | 7/1989 |
| JP | 6-193471 | 7/1994 |
| JP | 8-128304 | 5/1996 |
| JP | 10-196404 | 7/1998 |
| JP | 2000-27606 | 1/2000 |
| JP | 2003-247427 | 9/2003 |
| JP | 2007-041969 A | 2/2007 |
| JP | 2010-90816 | 4/2010 |
| JP | 2012-117523 | 6/2012 |
| JP | 2013-40567 | 2/2013 |
| JP | 2015-75106 | 4/2015 |
| JP | 2015-149885 | 8/2015 |
| JP | 2016-173103 | 9/2016 |
| JP | 2016-223361 | 12/2016 |
| JP | 2017-97582 | 6/2017 |
| JP | 6368611 | 8/2018 |
| JP | 6403883 | 10/2018 |
| JP | 2019-71710 | 5/2019 |
| JP | 2019-180163 | 10/2019 |

OTHER PUBLICATIONS

International Preliminary Report on Patentability issued Jun. 15, 2023 in corresponding International Application No. PCT/JP2021/044053, with English language translation.

Office Action dated Mar. 11, 2025, issued in corresponding Korean application No. 10-2023-7017630, with machine translation, 13 pages.

Office Action issued Jul. 24, 2025 in counterpart DE application No. 112021005182.2, with machine translation, 11 pages.

\* cited by examiner

200

LOAD ADJUSTMENT METHOD, LOAD ADJUSTMENT DEVICE, AND PROGRAM

TECHNICAL FIELD

The present disclosure relates to a load adjustment method, a load adjustment device, and a program.

The present application claims priority based on Japanese Patent Application No. 2020-201642 filed on Dec. 4, 2020, the entire content of which is incorporated herein by reference.

BACKGROUND ART

Thermal power generation systems equipped with gas turbines are required to improve their load change rate for better responsiveness to changes in renewable energy generation. For example, high load change rate is required when power producers supply regulating power, or reserve, in an electricity trading market where power producers and power transmission and distribution business operators trade regulating power. However, when attempting to control a gas turbine at high load change rate (particularly, high load increase rate), turbine damage may occur due to narrow tip clearance and contact between a rotating member and a stationary part.

Patent document 1 discloses a technique for setting the load increase rate of a gas turbine based on the metal temperature of a steam turbine. This technique takes into account the limitations of operating conditions of the steam turbine in a combined cycle power generation system.

CITATION LIST

Patent Literature

Patent Document 1: JP2016-223361A

SUMMARY

Problems to be Solved

In the technique of Patent Document 1, the limitations of operating conditions of the gas turbine (risk of occurrence of turbine damage) are not taken into account. In this case, since the upper limit of the load increase rate taking into account the limitations of operating conditions of the gas turbine is not used, it is not possible to adjust the load at the highest possible load change rate.

In view of the above circumstances, an object of the present disclosure is to provide a load adjustment method or the like whereby it is possible to adjust the load at high load change rate (for example, load increase rate) while suppressing the risk of turbine damage.

Solution to the Problems

A load adjustment method according to the present disclosure includes: a step of acquiring a warm-up parameter indicating the degree of warm-up of a gas turbine during operation under load; a step of determining an upper limit of a load increase rate in accordance with the warm-up parameter; and a step of increasing the load of the gas turbine at or below the upper limit of the load increase rate.

A load adjustment device according to the present disclosure includes: an acquisition part configured to acquire a warm-up parameter indicating the degree of warm-up of a gas turbine during operation under load; a determination part configured to determine an upper limit of a load increase rate in accordance with the warm-up parameter; and a load control part configured to increase the load of the gas turbine at or below the upper limit of the load increase rate.

A program according to the present disclosure is configured to execute: a process of acquiring a warm-up parameter indicating the degree of warm-up of a gas turbine during operation under load; a process of determining an upper limit of a load increase rate in accordance with the warm-up parameter; and a process of increasing the load of the gas turbine at or below the upper limit of the load increase rate.

Advantageous Effects

According to the present disclosure, it is possible to provide a load adjustment method or the like whereby it is possible to adjust the load at high load change rate (for example, load increase rate) while suppressing the risk of turbine damage.

DETAILED DESCRIPTION

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Configuration of Thermal Power Generation System

Figure 1:
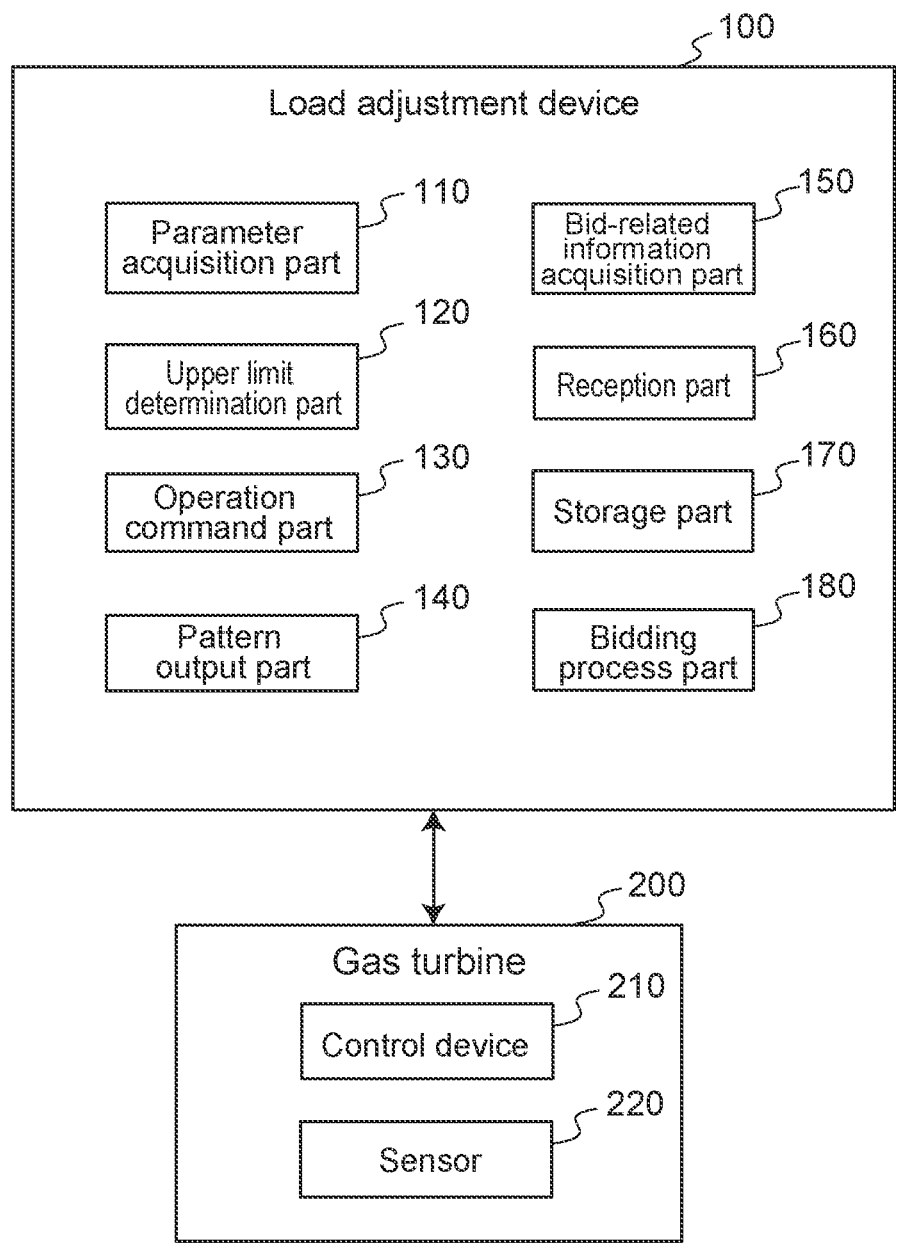
FIG. 1 is a block diagram schematically showing a functional configuration of a thermal power generation system including a load adjustment device according to an embodiment.

An overall configuration of a thermal power generation system 1 according to an embodiment will be described. FIG. 1 is a block diagram schematically showing a functional configuration of a thermal power generation system 1 including a load adjustment device 100 according to an embodiment.

The thermal power generation system 1 is a thermal power generation system including a gas turbine 200. The thermal power generation system 1 may be a gas turbine combined cycle power generation system (GTCC) including a gas turbine 200. As shown in FIG. 1, the thermal power generation system 1 includes a gas turbine 200 for power generation and a load adjustment device 100 for adjusting the load of the gas turbine 200.

The gas turbine 200 includes a control device 210 for controlling the operation of each part of the gas turbine 200, and a plurality of sensors 220 for detecting various state quantities (e.g., temperature, pressure, etc.) of the gas turbine 200. The plurality of sensors 220 may include a sensor for measuring a state quantity related to a warm-up parameter, which will be described later. The load adjustment device 100 is configured to communicate with the gas turbine 200.

Configuration of Load Adjustment Device

Figure 2:
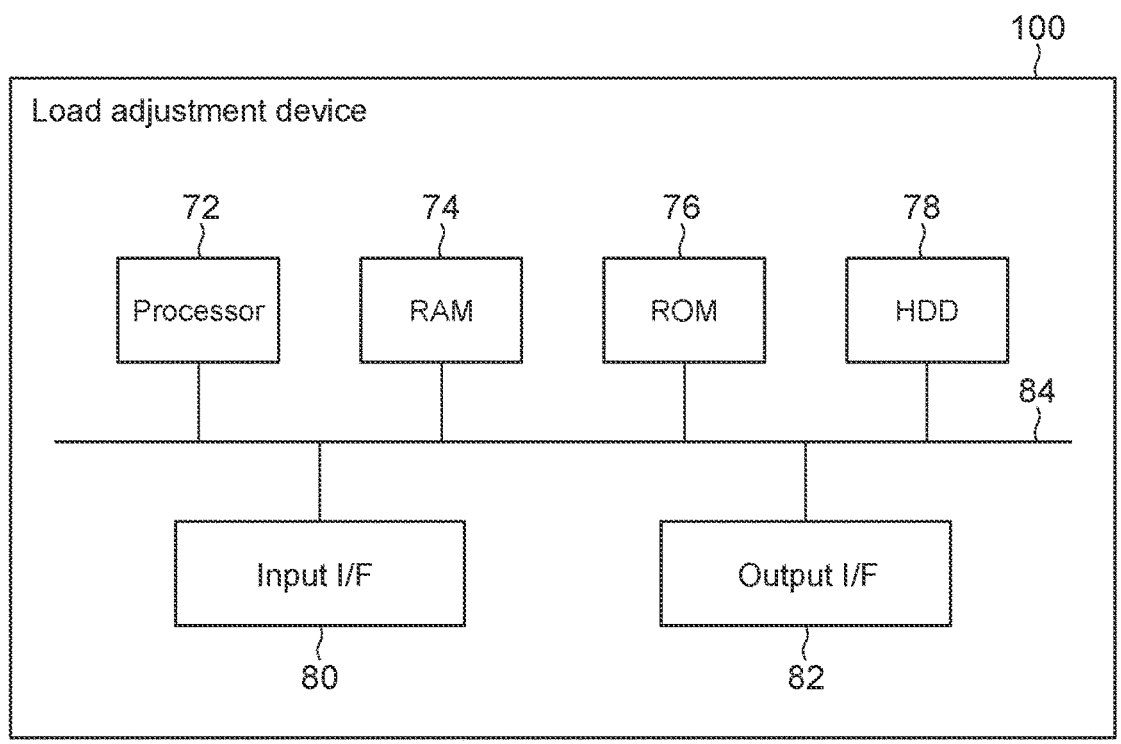
FIG. 2 is a block diagram schematically showing an example of a hardware configuration of the load adjustment device according to an embodiment.

FIG. 2 is a block diagram schematically showing a hardware configuration of the load adjustment device 100 according to an embodiment. For example, as shown in FIG. 2, the load adjustment device 100 is provided by a computer including a processor 72 such as a central processing unit (CPU) and a graphics processing unit (GPU), a random access memory (RAM) 74, a read only memory (ROM) 76, a hard disk drive (HDD) 78, an input I/F 80, and an output I/F 82, which are connected via a bus 84. The processor 72 of the load adjustment device 100 executes a program stored in the memory such as the ROM 76 and the RAM 74 to implement functions described later.

Hereinafter, the functional configuration of the load adjustment device 100 will be described with reference to FIG. 1, the load adjustment device 100 includes a parameter acquisition part 110 for acquiring a warm-up parameter, an upper limit determination part 120 for determining the upper limit of the load increase rate in control of the gas turbine 200, an operation command part 130 configured to output an operation command to the gas turbine 200, a pattern output part 140 configured to output one or more options of the operation pattern of the gas turbine 200, a bid-related information acquisition part 150 for acquiring bid-related information of an electricity trading market, a reception part 160 for receiving an input from the user, a storage part 170 for storing various information, and a bidding process part 180 for executing a bidding process in the electricity trading market.

The parameter acquisition part 110 acquires a warm-up parameter from the sensors 220 or the control device 210 provided in the gas turbine 200. The warm-up parameter is a parameter indicating the degree of warm-up of the gas turbine 200 during operation under load, and is a state quantity related to the clearance (tip clearance) of the gas turbine 200.

Figure 3:
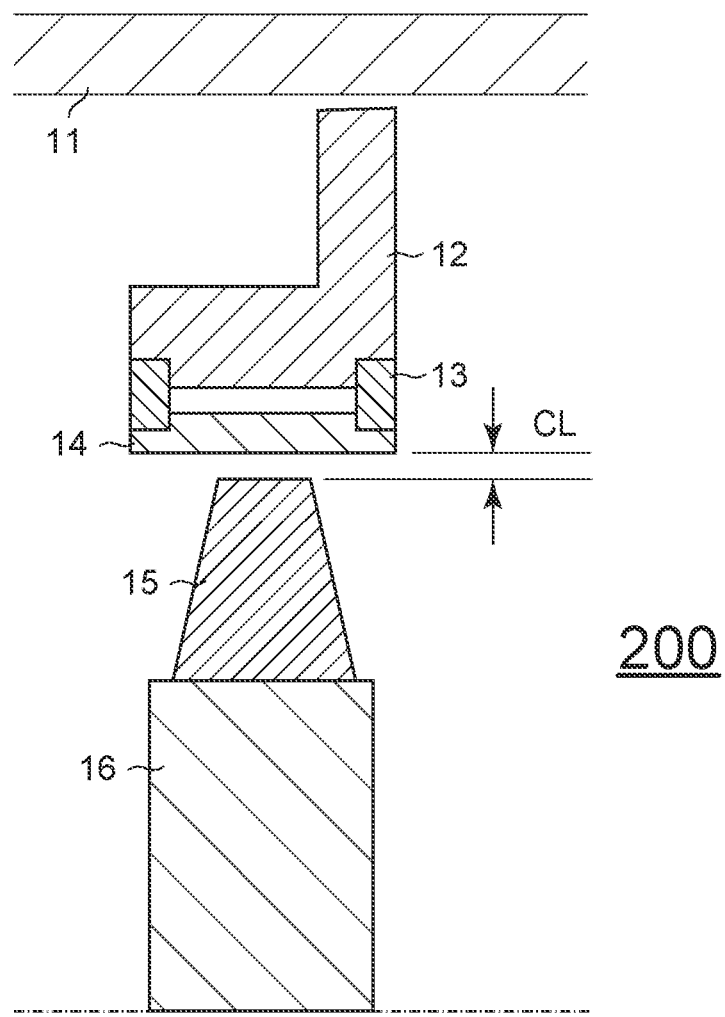
FIG. 3 is a schematic cross-sectional view for illustrating a clearance of a gas turbine.

Here, the clearance of the gas turbine 200 will be described. FIG. 3 is a schematic cross-sectional view for illustrating the clearance CL of the gas turbine 200. This figure shows a cross-section around turbine blades of the gas turbine 200 along the rotation axis, where the vertical direction corresponds to the radial direction of the gas turbine 200, and the horizontal direction corresponds to the axial direction of the gas turbine 200. The clearance CL is a gap between a stationary member and a rotating member of the gas turbine 200.

In the illustrated example, the gas turbine 200 includes a casing 11. A blade ring 12, a ring segment 13, and an isolation ring 14 are provided radially inside the casing 11 as stationary members. Further, a disk 15 and a rotor blade 16 are provided radially inward thereof as rotating members. In this case, the clearance CL can be roughly calculated from the expression. CL=clearance at assembly+thermal elongation of blade ring 12−thermal elongation of disk 15−thermal elongation of rotor blade 16−elongation of disk 15 due to centrifugal force−elongation of rotor blade 16 due to centrifugal force.

In this expression, the elongation due to centrifugal force after load is applied to the gas turbine 200 can be approximated as being constant. Therefore, in the end, the variable elements of the clearance CL are mainly the thermal elongation of the blade ring 12, which is a stationary member, and the thermal elongation of the disk 15 and the rotor blade 16, which are rotating members. Since the thermal elongation is determined by the radial dimension, coefficient of linear expansion, and temperature, the clearance CL can be estimated by monitoring the temperature.

Therefore, for example, the warm-up parameter used to take the clearance CL into account may be a measured value of one or more of the following: disk cavity temperature, stationary metal temperature, temperature difference between a casing and a rotor, and shaft elongation difference. The disk cavity temperature may be, for example, the temperature of the disk 15 shown in FIG. 3. The stationary metal temperature may be, for example, the temperature of the casing 11 (casing metal temperature) or the blade ring 12 shown in FIG. 3. The temperature difference between a casing and a rotor may be, for example, the temperature difference between the casing 11 and the disk 15 shown in FIG. 3. The shaft elongation difference may be, for example, a measured value of a shaft elongation difference meter (not shown) configured to detect the elongation difference on the exhaust side at the position of a thrust bearing on the compressor side (not shown) of the gas turbine 200.

The temperature of the disk 15, the rotor blade 16, the blade ring 12 or the like may be acquired indirectly from measured values of combustion gas temperature, cooling air temperature, pressure, etc. These measured values may be used as the warm-up parameter. Thus, the warm-up parameter is not limited to temperature and should be interpreted in a broad sense.

When predetermined conditions are met, the clearance CL can also be considered a function of the load. The steady-state temperature of each part of the gas turbine 200 generally depends on the magnitude of the load. For example, the temperatures of the rotor blade 16 and the blade ring 12 tend to be proportional to the magnitude of the load. The temperature of the disk 15 tends to be proportional to the magnitude of the load up to a certain degree of load and saturates at a load above the certain degree of load. Thus, the clearance CL can be estimated by estimating the temperature from the load. Therefore, the warm-up parameter may be the most recent past load history.

If the warm-up state continues with a low load change rate, the temperature distribution is in a steady state depending on the magnitude of the load, so the magnitude of the load can be used as the warm-up parameter. Thus, the upper limit determination part 120 may be configured to, when the load change rate in the most recent past load history is equal to or less than a reference value, acquire the most recent past load magnitude in this load history as the warm-up parameter. By analyzing the time constant of temperature change corresponding to load change in advance, it is also possible to acquire the warm-up parameter that accurately reflects the temperature status from the load history.

The upper limit determination part 120 determines the upper limit of the load increase rate in control of the gas turbine 200 in accordance with the warm-up parameter. In some embodiments, when regulating power is supplied, the upper limit determination part 120 determines as the upper limit of the load increase rate a value larger than the load increase rate when applying load to the gas turbine 200 from a stop.

The upper limit determination part 120 may determine the upper limit of the load increase rate in accordance with the warm-up parameter acquired by the parameter acquisition part 110, using a function representing a relationship between the warm-up parameter and the upper limit of the load increase rate. The function representing a relationship between the warm-up parameter and the upper limit of the load increase rate may be stored in the storage part 170, for example.

Figure 4:
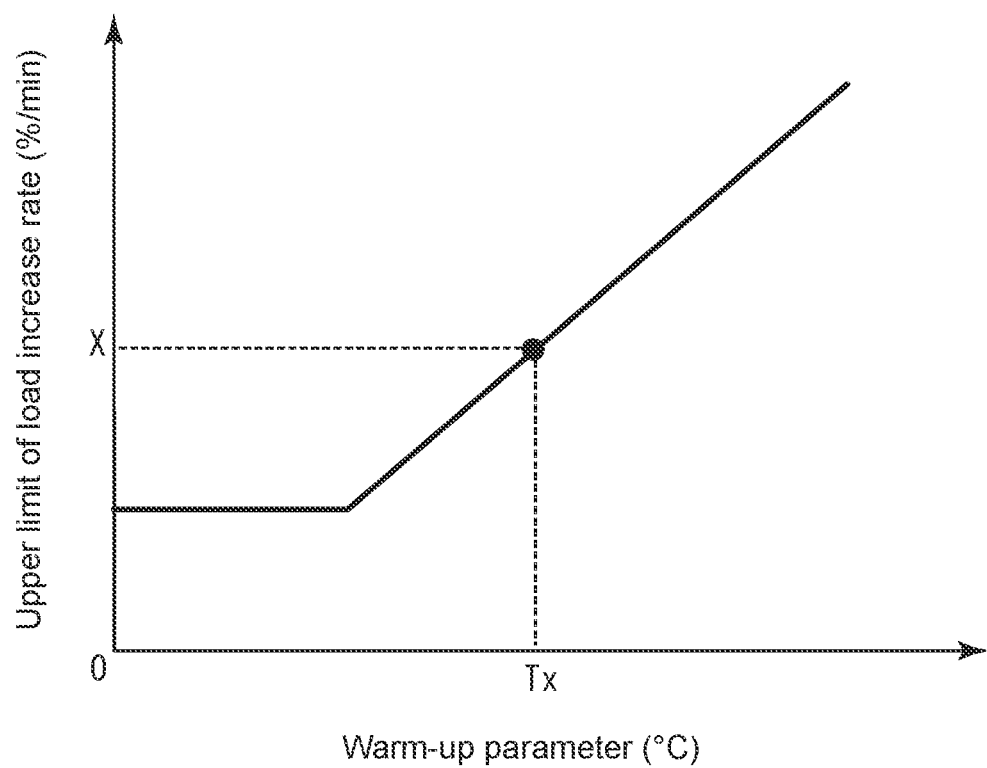
FIG. 4 is a graph showing an example of a function used in the load adjustment device according to an embodiment.

FIG. 4 is a graph showing an example of a function used in the load adjustment device 100 according to an embodiment. In the exemplary function shown in FIG. 4, the warm-up parameter represented on the horizontal axis is the disk cavity temperature or casing temperature of the gas turbine 200, and the upper limit of the load increase rate represented on the vertical axis is the load increase rate obtained by dividing the maximum allowable load increase rate per minute by the rated load.

For example, as shown in FIG. 4, when the warm-up parameter acquired by the parameter acquisition part 110 is Tx (° C.), the upper limit determination part 120 determines the upper limit of the load increase rate to be X (%/min). The function used in the load adjustment device 100 may be, for example, as shown in FIG. 4, a function in which the upper limit of the load increase rate is constant in the region where the warm-up parameter is low temperature, while the higher the warm-up parameter is, the higher the upper limit of the load increase rate in the region where the warm-up parameter is high temperature. The function is not limited to the example shown in FIG. 4.

The operation command part 130 outputs an operation command to increase the load of the gas turbine at or below the upper limit of the load increase rate determined by the upper limit determination part 120. In some embodiments, the gas turbine 200 operates at partial load for supplying electricity to a wholesale electricity trading market or an electricity storage device (not shown). In this case, the operation command part 130 may output an operation command to increase the load from the partial load to a load corresponding to regulating power supplied to an electricity trading market to the gas turbine 200.

The pattern output part 140 outputs one or more options of the operation pattern to improve the load increase rate of the gas turbine 200. The one or more options of the operation pattern may include an operation pattern option to execute warm-up operation and an operation pattern option using active clearance control (ACC). ACC is a technique that changes the thermal distribution of the gas turbine 200 by heating a stationary member to provide clearance. The one or more options of the operation pattern may further include an operation pattern option to execute both warm-up operation and ACC, or may include an operation pattern option that determines the limitation on the load increase rate from the current warm-up state as the upper limit.

Figure 5A:
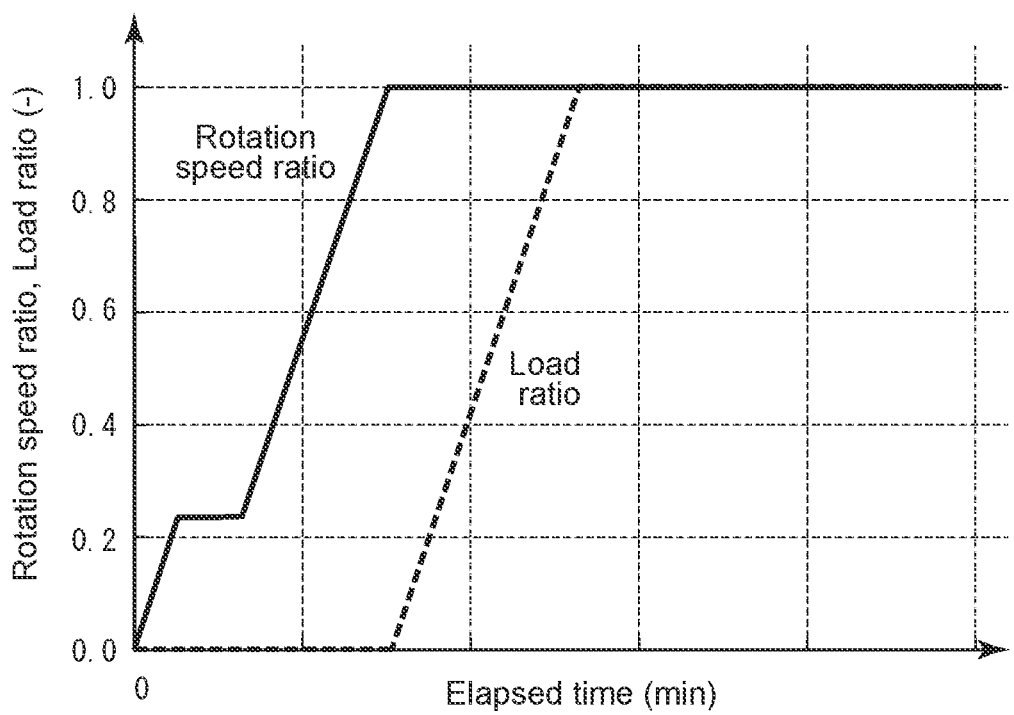
FIG. 5A is a graph for describing an example of changes in rotation speed ratio and load ratio of the gas turbine over time when the load adjustment device according to a comparative example is applied.
Figure 5B:
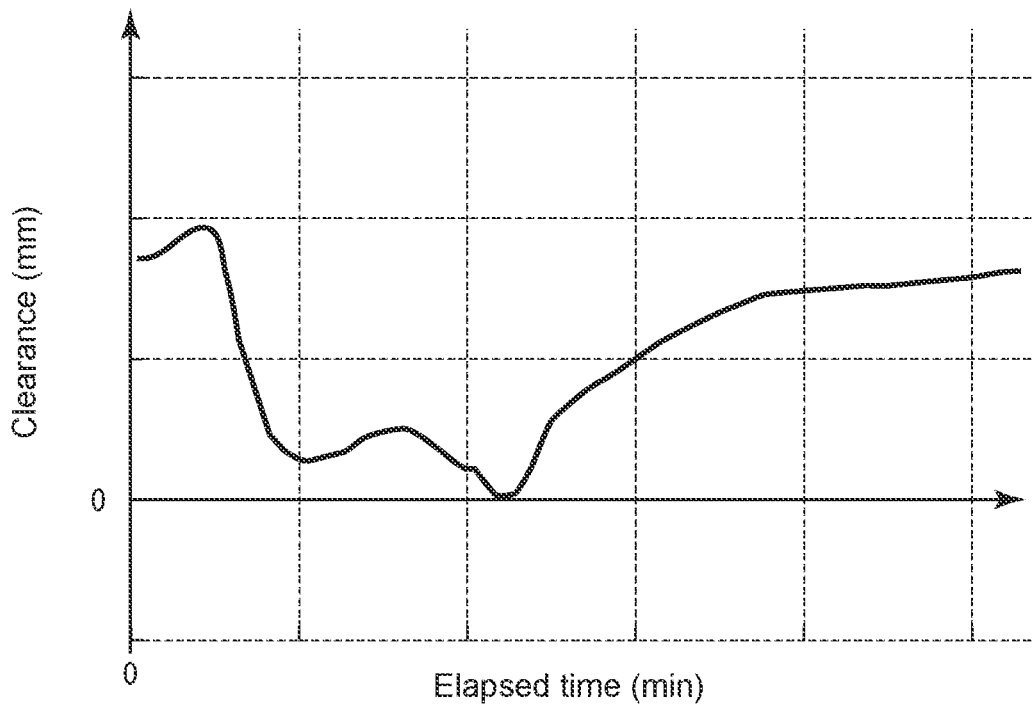
FIG. 5B is a graph for describing an example of changes in clearance of the gas turbine over time when the load adjustment device according to a comparative example is applied.

Here, the limitations of the load increase rate w % ben not performing warm-up operation and when performing warm-up operation will be described. FIG. 5A is a graph for describing an example of changes in rotation speed ratio and load ratio of the gas turbine 200 over time when the load adjustment device (not shown) according to a comparative example is applied. FIG. 5B is a graph for describing an example of changes in clearance of the gas turbine 200 over time when the load adjustment device (not shown) according to a comparative example is applied.

Figure 6A:
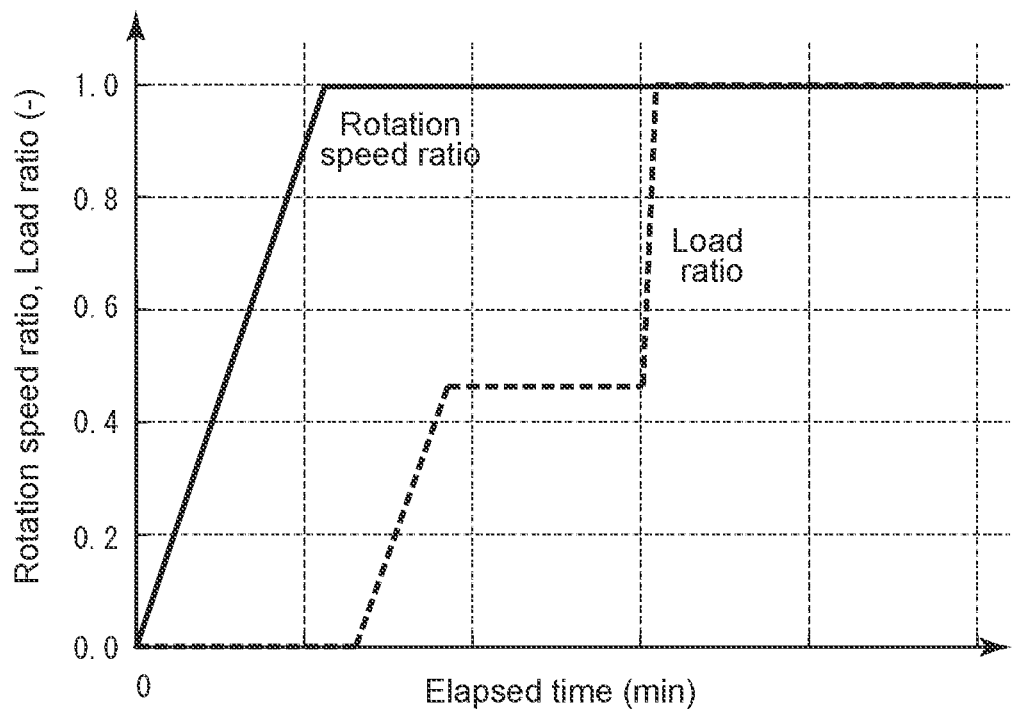
FIG. 6A is a graph for describing an example of changes in rotation speed ratio and load ratio of the gas turbine over time when the load adjustment device according to an embodiment is applied.
Figure 6B:
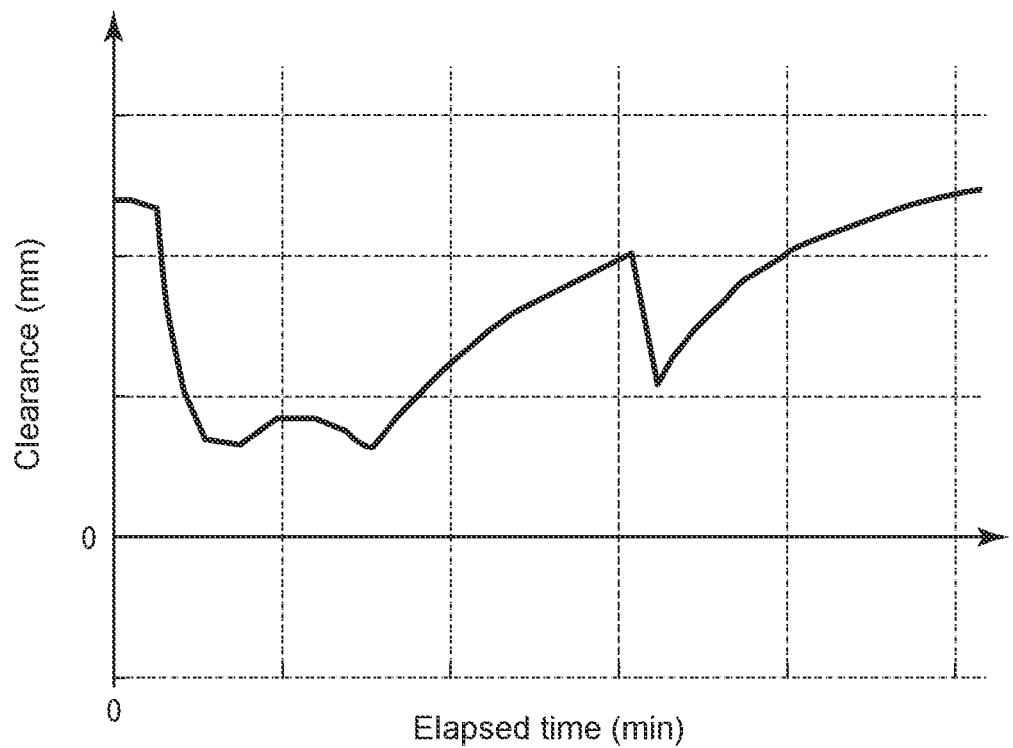
FIG. 6B is a graph for describing an example of changes in clearance of the gas turbine over time when the load adjustment device according to an embodiment is applied.

FIG. 6A is a graph for describing an example of changes in rotation speed ratio and load ratio of the gas turbine 200 over time when the load adjustment device 100 according to an embodiment is applied. FIG. 6B is a graph for describing an example of changes in clearance of the gas turbine 200 over time when the load adjustment device 100 according to an embodiment is applied.

In the graphs shown in FIGS. 5A and 6A, the vertical axis represents the rotation speed ratio (no units) or load ratio (no units). The rotation speed ratio is the ratio of rotation speed to the rated speed. The load ratio is the ratio of load to the rated load. The horizontal axis represents the elapsed time (min) since the gas turbine 200 is started.

In the graphs shown in FIGS. 5B and 6B, the vertical axis represents the clearance (mm) between a stationary member and a rotating member, and the horizontal axis represents the elapsed time (min) since the gas turbine 200 is started. The graphs in FIGS. 5B and 6B show the average value of changes in clearance over time in a cross-section of the gas turbine 200. To avoid turbine damage, the clearance must not reach zero in all directions.

In the comparative example, as shown in FIG. 5A, the gas turbine 200 does not perform warm-up operation. Therefore, after the rotation speed ratio shown by the solid line reaches the rated speed, the load ratio shown by the dashed line rises to the rated load at once at a constant load increase rate. The clearance corresponding to FIG. 5A is minimum when the rated load is reached, as shown in FIG. 5B, where the turbine may be damaged due to the clearance close to zero. To reduce this risk, the load increase rate must be lowered.

In contrast, when the load adjustment device 100 according to an embodiment is applied, the gas turbine 200 performs warm-up operation as shown in FIG. 6B. Therefore, after the rotation speed ratio shown by the solid line reaches the rated speed, the load ratio shown by the dashed line rises halfway at a constant load increase rate and then is kept at partial load until a predetermined time has elapsed. After the warm-up operation, the load ratio rises again to reach the rated load.

Although the clearance corresponding to FIG. 6A becomes small when the rated load is reached, as shown in FIG. 6B, the risk of turbine damage is small due to sufficient margin to zero. This is because the clearance recovers during the warm-up operation. Thus, when warm-up operation is performed, the load increase rate after warm-up operation can be higher than in the comparative example where warm-up operation is not performed.

With the load adjustment device 100 according to some embodiments, with such advantages, it is possible to provide commodities with short response times in supply of regulating power. In addition, power generated in warm-up operation can be effectively utilized by supplying it to a storage device or a wholesale trading market.

In some embodiments, the operation command part 130 selects an operation pattern option to be performed from the one or more options of the operation pattern output from the pattern output part 140, and outputs an operation command based on the selected operation pattern. However, the operation pattern option to be performed may be selected by the user from the one or more options of the operation pattern output from the pattern output part 140, and the reception part 160 may receive the selected input. In this case, the operation command part 130 outputs an operation command based on the operation pattern selected by the user.

The bid-related information acquisition part 150 acquires bid-related information of an electricity trading market through communication with another device via a network, for example. The bid-related information includes, for example, information on electricity demand (e.g., time of day when demand can occur, size of electricity demand, etc.) and forecast information on electricity prices.

The bidding process part 180 refers to the bid-related information obtained by the bid-related information acquisition part 150 and executes a bidding process. The bidding process may include outputting candidate commodities and determining bid contents. The bid content includes, for example, the bidding start time, target commodities, amount of power generated, bid prices, etc. The bid content is determined using, for example, information accumulated in a database, simulation results, distribution information, and the like.

The bid commodities are differentiated by requirements such as response time to an output command (e.g., 5, 15, or 45 minutes) and minimum bid amount (e.g., 5 MW), for example. In order to meet the response time requirement, the load change ratio needs to be improved. In this disclosure, ACC and warm-up operation are proposed as measures to improve it.

In some embodiments, the bidding process part 180 outputs one or more candidate commodities available for bidding to an electricity trading market on the basis of performance of the gas turbine 200 stored in the storage part 170 in advance and operating conditions including the warm-up parameter acquired by the parameter acquisition part 110. One or more candidate commodities available for bidding are updated at each gate close (e.g., hourly) of a wholesale power market or the like.

In some embodiments, the bidding process part 180 may be configured to predict the behavior of the clearance between a stationary part and a rotating member of the gas turbine 200 during load increase on the basis of the warm-up parameter acquired by the parameter acquisition part 110. In this case, the bidding process part 180 may be configured to determine the upper limit of the load increase rate of the gas turbine 200 so that the clearance does not become zero on the basis of a prediction result of the behavior of the clearance, and output one or more candidate commodities on the basis of the determined upper limit of the load increase rate.

In some embodiments, the bidding process part 180 is configured to calculate a probability of successful bid for the candidate commodity and a profit/loss on winning the bid in the case of bidding in the electricity trading market, and determine a bid content for the electricity trading market on the basis of the calculated probability and profit/loss. The probability of successful bid is calculated based on, for example, acquired information on electricity demand and electricity price forecasts in the electricity trading market and past successful bid records of the gas turbine. The profit/loss on winning the bid is calculated based on, for example, the successful bid price (bid price) and the costs associated with fuel consumption and equipment maintenance (e.g., lifetime consumption).

In some embodiments, the bidding process part 180 may be configured to accumulate in the storage part 170 information on an operation record of the gas turbine 200 based on the bid content and a successful bid record for the bid content. The information accumulated in the storage part 170 can be used to determine the contents of subsequent bids. For example, the successful bid record can be used as basic information for the probability distribution of the successful bid probability, and information on the operation record can be used as basic information for the lifetime consumption in profit/loss calculations.

In some embodiments, when an operation pattern option to execute warm-up operation is selected from the one or more options of the operation pattern, the parameter acquisition part 110 acquires the warm-up parameter and the operation command part 130 outputs an operation command to increase the load to the gas turbine 200. In some embodiments, the operation command part 130 outputs an operation command to increase the load to a load corresponding to regulating power of a successful bid commodity as a result of the bidding process by the bidding process part 180.

Flow of Processing

Figure 7:
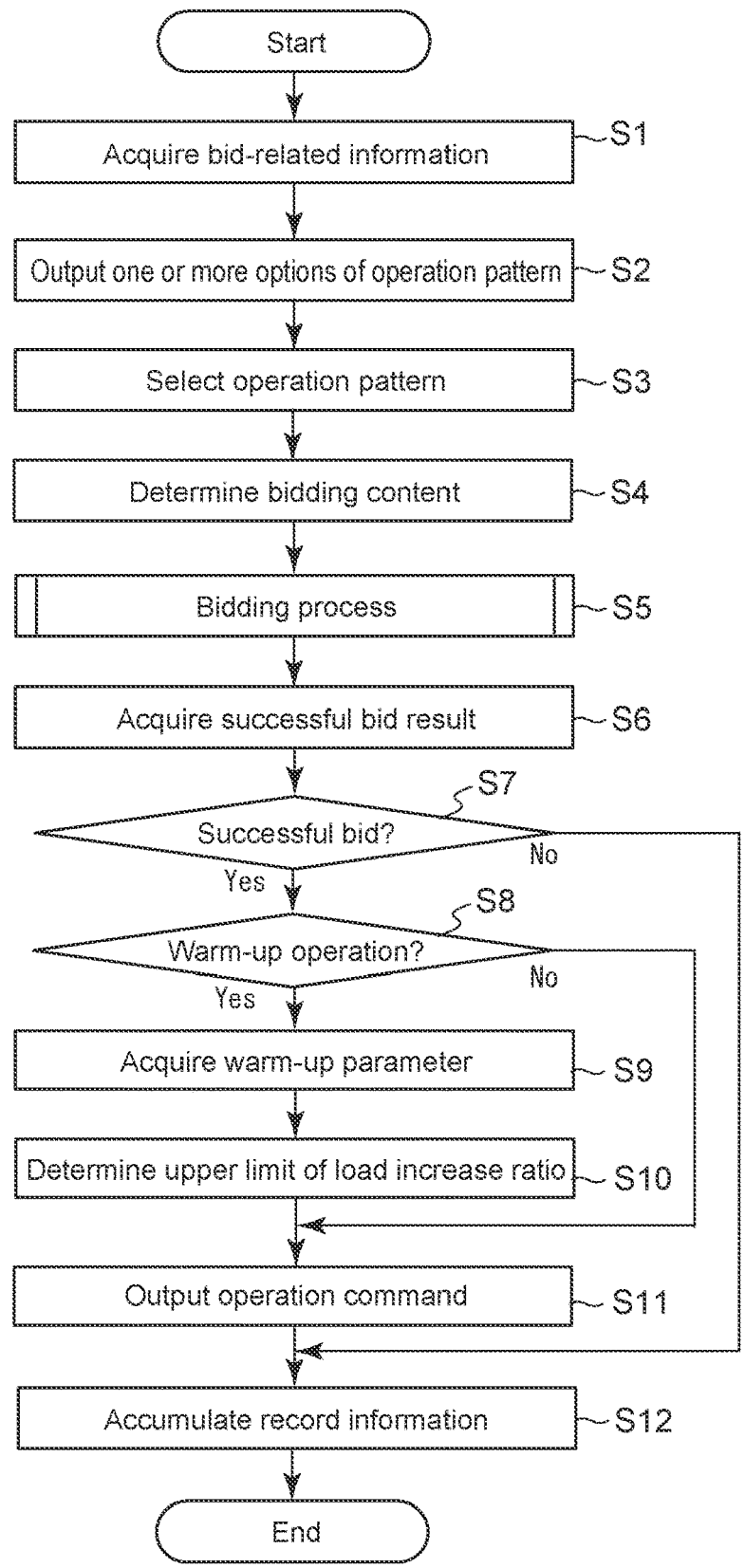
FIG. 7 is a flowchart for describing an example of processing executed by the load adjustment device according to an embodiment.

The flow of processing performed by the load adjustment device 100 according to an embodiment will now be described. FIG. 7 is a flowchart for describing an example of processing executed by the load adjustment device 100 according to an embodiment.

Part of the processing described below may be performed manually by the user. The example shown in FIG. 7 illustrates the process when warm-up operation is performed after the bid content of regulating power is awarded. However, the warm-up operation may be performed even before the bidding, and the upper limit of the load increase rate may be determined based on the warm-up parameter in that warm-up state. In addition, the warm-up state during the demand time period may be predicted based on past record data, and the upper limit of the load increase rate may be determined based on the prediction result.

As shown in FIG. 7, the bid-related information acquisition part 150 of the load adjustment device 100 acquires bid-related information from another device via a network, for example (step S1).

The pattern output part of the load adjustment device 100 outputs one or more options of the operation pattern (step S2). Here, the user or the bidding process part 180 of the load adjustment device 100 selects an operation pattern from the one or more options of the operation pattern (step S3).

The bidding process part 180 of the load adjustment device 100 determines a bid content (step S4). Further, the bidding process part 180 of the load adjustment device 100 executes a bidding process (step S5), and the load adjustment device 100 acquires a successful bid result (step S6).

Here, the load adjustment device 100 determines whether a successful bid has been made for the bid commodity (step S7). If it is determined that no successful bid has been made for the bid commodity (step S7; No), the load adjustment device 100 skips steps S8 to S11 and stores the record information indicating that the bid was not successful in the storage part 170 (step S12). On the other hand, if it is determined that a successful bid has been made for the bid commodity (step S7; Yes), the load adjustment device 100 determines whether the operation pattern corresponding to the commodity is an operation pattern to execute warm-up operation (step S8).

When it is determined to be the operation pattern to execute warm-up operation (step S8; Yes), the parameter acquisition part 110 of the load adjustment device 100 acquires the warm-up parameter (step S9). Further, the upper limit determination part 120 of the load adjustment device 100 determines the upper limit of the load increase rate on the basis of the warm-up parameter (step S10). The warm-up parameter and load increase condition options may be input to a clearance simulator to determine a load increase pattern so that the prediction result of clearance does not become zero, and this may be used as the operation pattern. On the other hand, if it is determined not to be the operation pattern to execute warm-up operation (step S8; No), the load adjustment device 100 skips steps S9 and S10.

The operation command part 130 outputs an operation command (step S11). For example, when executing the operation pattern for warm-up operation, the operation command part 130 first outputs an operation command to perform warm-up operation during a grace period (usually about one hour) from the time of successful bid to the time of electricity demand. Then, an operation command is outputted to increase the load of the gas turbine to a load corresponding to the regulating power at or below the upper limit of the load increase rate determined by the upper limit determination part 120.

On the other hand, when not executing the operation pattern for warm-up operation, the operation command part 130 outputs ACC or any other operation command. If the clearance can be ensured even with normal load increase, the load may be increased at the normal load increase rate.

The load adjustment device 100 then accumulates record information indicating a successful bid record and an operation record in the storage part 170 (step S12). The accumulated information may be utilized in determining the next and subsequent bidding processes.

The present disclosure is not limited to the embodiments described above, but includes modifications to the embodiments described above, and embodiments composed of combinations of those embodiments.

CONCLUSION

The contents described in the above embodiments would be understood as follows, for instance.

(1) A load adjustment method according to the present disclosure includes: a step of acquiring a warm-up parameter indicating the degree of warm-up of a gas turbine (200) during operation under load; a step of determining an upper limit of a load increase rate in accordance with the warm-up parameter; and a step of increasing the load of the gas turbine (200) at or below the upper limit of the load increase rate.

With the above method, the upper limit of the load increase rate is determined in accordance with the warm-up parameter of the gas turbine (200) during operation under load, and the load of the turbine is increased at or below the upper limit of the load increase rate. In this case, the upper limit of the load increase rate can be determined to reduce the risk of turbine damage. It is also possible to adjust the load at the highest possible load change rate (e.g., load increase rate) within a range that does not exceed that upper limit.

(2) In some embodiments, in the above method (1), the gas turbine (200) operates at partial load for supplying electricity to a wholesale electricity trading market or an electricity storage device. The step of increasing the load includes increasing the load from the partial load to a load corresponding to regulating power supplied to an electricity trading market.

With the above method, power generation during partial load operation can be effectively utilized. In addition, since the increase from the partial load is supplied to the electricity trading market as regulating power, the load can be adjusted at high load change rate.

(3) In some embodiments, the above method (1) or (2) includes: a step of outputting one or more options of an operation pattern to improve the load increase rate; and a step of selecting an operation pattern option to be performed from the one or more options of the operation pattern. When an operation pattern option to execute warm-up operation is selected from the one or more options of the operation pattern, the step of acquiring the warm-up parameter and the step of increasing the load are performed.

With the above method, the acquisition of warm-up parameter and the load increase are performed only when it is desirable to perform warm-up operation. This makes it possible to respond flexibly, taking into account, for example, the load increase rate, efficiency, economy, and lifetime consumption.

(4) In some embodiments, in the above method (3), the one or more options of the operation pattern includes an operation pattern option to execute warm-up operation and an operation pattern option using active clearance control (ACC).

With the above method, a better option can be selected from the operation pattern to execute warm-up operation and the operation pattern using ACC and executed.

(5) In some embodiments, in any one of the above methods (1) to (4), the warm-up parameter includes any one parameter of disk cavity temperature, stationary metal temperature, temperature difference between a casing and a rotor, shaft elongation difference, or the most recent past load history.

With the above method, the degree of warm-up of the gas turbine (200) can be detected accurately.

(6) In some embodiments, in any one of the above methods (1) to (5), when a load change rate in the most recent past load history is equal to or less than a reference value, the most recent past load magnitude in the load history is acquired as the warm-up parameter.

If the warm-up state continues with a low load change rate, the temperature distribution is in a steady state depending on the magnitude of the load, so the magnitude of the load can be used as the warm-up parameter. With the above method, the magnitude of the load is acquired as the warm-up parameter. This is advantageous in that the acquisition of temperature measurements is no longer mandatory.

(7) In some embodiments, any one of the above methods (1) to (6) includes a step of determining the upper limit of the load increase rate in accordance with the warm-up parameter acquired in the step of acquiring the warm-up parameter, using a function representing a relationship between the warm-up parameter and the upper limit of the load increase rate.

With the above method, the upper limit of the load increase rate can be quickly determined.

(8) In some embodiments, in any one of the above methods (1) to (7), the upper limit of the load increase rate is set greater than a load increase rate when applying load to the gas turbine (200) from a stop.

The above method is advantageous in that it is suitable for supplying regulating power.

(9) In some embodiments, any one of the above methods (1) to (8) includes a step of outputting one or more candidate commodities available for bidding to an electricity trading market on the basis of performance of the gas turbine (200) and operating conditions including the warm-up parameter. The step of increasing the load includes increasing the load to a load corresponding to regulating power of a successful bid candidate commodity.

With the above method, bidding on the electricity trading market and control of the gas turbine (200) after a successful bid can be smoothly performed.

(10) In some embodiments, the above method (9) includes a step of predicting a behavior of a clearance between a stationary part and a rotating member of the gas turbine (200) during load increase on the basis of the warm-up parameter. The step of outputting candidate commodities includes determining the upper limit of the load increase rate so that the clearance does not become zero on the basis of a prediction result of the behavior of the clearance, and outputting one or more candidate commodities on the basis of the determined upper limit of the load increase rate.

With the above method, since the upper limit of the load increase rate is determined based on the prediction result of the clearance behavior, sufficient clearance can be ensured more reliably.

(11) In some embodiments, the above method (9) or (10) includes: a step of calculating a probability of successful bid for the candidate commodity and a profit/loss on winning the bid in the case of bidding in the electricity trading market; and a step of determining a bid content for the electricity trading market on the basis of the probability of successful bid and the profit/loss.

With the above method, it is possible to determine the bid content under favorable conditions as the bid content for the demand balancing market.

(12) In some embodiments, the above method (11) includes a step of accumulating information on an operation record of the gas turbine (200) based on the bid content and a successful bid record for the bid content.

With the above method, the accumulated information can be used to determine the contents of subsequent bids. For example, the successful bid record can be used as basic information for the probability distribution of the successful bid probability, and information on the operation record can be used as basic information for the lifetime consumption in profit/loss calculations.

(13) A load adjustment device (100) according to the present disclosure includes, a parameter acquisition part (110) configured to acquire a warm-up parameter indicating the degree of warm-up of a gas turbine (200) during operation under load; an upper limit determination part (120) configured to determine an upper limit of a load increase rate in accordance with the warm-up parameter; and an operation command part (130) configured to output an operation command to increase the load of the gas turbine (200) at or below the upper limit of the load increase rate.

With the above configuration, the upper limit of the load increase rate is determined in accordance with the warm-up parameter of the gas turbine (200) during operation under load, and the load of the turbine is increased at or below the upper limit of the load increase rate. In this case, the upper limit of the load increase rate can be determined to reduce the risk of turbine damage. It is also possible to adjust the load at the highest possible load change rate (e.g., load increase rate) within a range that does not exceed that upper limit.

(14) A program according to the present disclosure is configured to cause a computer to execute: a process of acquiring a warm-up parameter indicating the degree of warm-up of a gas turbine during operation under load; a process of determining an upper limit of a load increase rate in accordance with the warm-up parameter; and a process of increasing the load of the gas turbine at or below the upper limit of the load increase rate.

With the above program, the upper limit of the load increase rate is determined in accordance with the warm-up parameter of the gas turbine (200) during operation under load, and the load of the turbine is increased at or below the upper limit of the load increase rate. In this case, the upper limit of the load increase rate can be determined to reduce the risk of turbine damage. It is also possible to adjust the load at the highest possible load change rate (e.g., load increase rate) within a range that does not exceed that upper limit.

REFERENCE SIGNS LIST

1 Thermal power generation system
11 Casing
12 Blade ring
13 Ring segment
14 Isolation ring
15 Disk
16 Rotor blade
72 Processor
74 RAM
76 ROM
78 HDD
80 Input I/F
82 Output I/F
84 Bus
100 Load adjustment device
110 Parameter acquisition part
120 Upper limit determination part
130 Operation command part
140 Pattern output part
150 Bid-related information acquisition part
160 Reception part
170 Storage part
180 Bidding process part
200 Gas turbine
210 Control device
220 Sensor
CL Clearance

The invention claimed is:

1. A load adjustment method, comprising:
a step of acquiring bid-related information including at least one of information on electricity demand in an electricity trading market or forecast information on electricity prices in the electricity trading market;
a step of executing a bidding process, the bidding process including transmitting data indicating a commodity to the electricity trading market, the commodity having response time of a gas turbine to an output command or minimum bid amount;
a step of acquiring a warm-up parameter when it is determined that a successful bid has been made for the commodity, the warm-up parameter indicating an amount of warm-up of the gas turbine during operation under load;
a step of determining an upper limit of a load increase rate in accordance with the warm-up parameter; and
a step of increasing the load of the gas turbine to a first load at a first load increase rate, then further increasing the load to a second load which is larger than the first load at a second load increase rate which is larger than the first load increase rate after performing warm-up operation in a state that the load is maintained at the first load, and
wherein the second load increase rate is equal to or below the upper limit of the load increase rate.

2. The load adjustment method according to claim 1,
wherein the first load is partial load for supplying electricity to the electricity trading market or an electricity storage device, and
wherein the second load is a load corresponding to regulating power supplied to the electricity trading market.

3. The load adjustment method according to claim 1, comprising:
a step of outputting one or more options of an operation pattern; and
a step of selecting an operation pattern option to execute warm-up operation to be performed from the one or more options of the operation pattern,
wherein the step of acquiring the warm-up parameter and the step of increasing the load are performed when the operation pattern option to execute warm-up operation has been selected.

4. The load adjustment method according to claim 3,
wherein the one or more options of the operation pattern include the operation pattern option to execute warm-up operation and an operation pattern option using active clearance control (ACC).

5. The load adjustment method according to claim 1,
wherein the warm-up parameter includes any one parameter of disk cavity temperature, stationary metal temperature, temperature difference between a casing and a rotor, shaft elongation difference, or most recent past load history.

6. The load adjustment method according to claim 1,
wherein, when a load change rate in most recent past load history is equal to or less than a reference value, most recent past load magnitude in the load history is acquired as the warm-up parameter.

7. The load adjustment method according to claim 1, comprising a step of determining the upper limit of the load increase rate in accordance with the warm-up parameter acquired in the step of acquiring the warm-up parameter, using a function representing a relationship between the warm-up parameter and the upper limit of the load increase rate.

8. The load adjustment method according to claim 1,
wherein the upper limit of the load increase rate is set greater than a load increase rate when applying load to the gas turbine from a stop.

9. The load adjustment method according to claim 1, comprising a step of outputting one or more candidate commodities, corresponding to the commodity, available for bidding to the electricity trading market on the basis of performance of the gas turbine and operating conditions including the warm-up parameter,
wherein the step of increasing the load includes increasing the load to a load corresponding to regulating power of a successful bid candidate commodity.

10. The load adjustment method according to claim 9, comprising a step of predicting a behavior of a clearance between a stationary part and a rotating member of the gas turbine during load increase on the basis of the warm-up parameter,
wherein the step of outputting candidate commodities includes determining the upper limit of the load increase rate so that the clearance does not become zero on the basis of a prediction result of the behavior of the clearance, and outputting one or more candidate commodities on the basis of the determined upper limit of the load increase rate.

11. The load adjustment method according to claim 9, comprising:
a step of calculating a probability of successful bid for the candidate commodity and a profit/loss on winning the successful bid for the candidate commodity in the case of bidding in the electricity trading market; and
a step of determining a bid content for the electricity trading market on the basis of the probability of successful bid and the profit/loss.

12. The load adjustment method according to claim 11, comprising a step of accumulating information on an operation record of the gas turbine based on the bid content and a successful bid record for the bid content.

13. A load adjustment device, comprising:
a bid-related information acquisition part configured to acquire bid-related information including at least one of information on electricity demand in an electricity trading market or forecast information on electricity prices in the electricity trading market;
a bidding process part configured to execute a bidding process, the bidding process including transmitting data indicating a commodity to the electricity trading market, the commodity having response time of a gas turbine to an output command or minimum bid amount;
a parameter acquisition part configured to acquire a warm-up parameter when it is determined that a successful bid has been made for the commodity, the warm-up parameter indicating an amount of warm-up of the gas turbine during operation under load;
an upper limit determination part configured to determine an upper limit of a load increase rate in accordance with the warm-up parameter; and
an operation command part configured to output an operation command to increase the load of the gas turbine to a first load at a first load increase rate, then further increasing the load to a second load which is larger than the first load at a second load increase rate which is larger than the first load increase rate after performing warm-up operation in a state that the load is maintained at the first load, and wherein the second load increase rate is equal to or below the upper limit of the load increase rate.

14. A non-transitory computer readable medium recorded with a program configured to cause a computer to execute:

a process of acquiring bid-related information including at least one of information on electricity demand in an electricity trading market or forecast information on electricity prices in the electricity trading market;

a process of executing a bidding process, the bidding process including transmitting data indicating a commodity to the electricity trading market, the commodity having response time of a gas turbine to an output command or minimum bid amount;

a process of acquiring a warm-up parameter when it is determined that a successful bid has been made for the commodity, the warm-up parameter indicating an amount of warm-up of the gas turbine during operation under load;

a process of determining an upper limit of a load increase rate in accordance with the warm-up parameter; and a process of increasing the load of the gas turbine to a first load at a first load increase rate, then further increasing the load to a second load which is larger than the first load at a second load increase rate which is larger than the first load increase rate after performing warm-up operation in a state that the load is maintained at the first load, and wherein the second load increase rate is equal to or below the upper limit of the load increase rate.

* * * * *